United States Patent [19]

Halligan

[11] 3,799,017

[45] Mar. 26, 1974

[54] COMPONENT LEAD CUTTER

[76] Inventor: Dewey D. Halligan, 6251 Empress Ct., San Jose, Calif. 95129

[22] Filed: Sept. 14, 1972

[21] Appl. No.: 288,929

[52] U.S. Cl. .................... 83/167, 83/444, 83/449, 83/580, 83/599, 83/602, 83/925 R

[51] Int. Cl. .................... B26d 7/06

[58] Field of Search .......... 83/167, 444, 449, 599, 83/580, 602, 925 R

[56] References Cited

UNITED STATES PATENTS

| | | | |
|---|---|---|---|
| 298,240 | 5/1884 | Savage | 83/449 X |
| 1,299,233 | 4/1919 | Royer | 83/420 X |
| 920,426 | 5/1909 | Burdick | 83/444 X |
| 3,233,486 | 2/1966 | Bavers et al. | 83/420 X |

*Primary Examiner*—Frank T. Yost
*Attorney, Agent, or Firm*—Schatzel & Hamrick

[57] ABSTRACT

An electrical circuit component lead cutter including a slotted track for receiving the downwardly extending component wire leads and conveying them into operative engagement with a shearing mechanism which trims the leads to a selected length. The track is inclined at an angle relative to the horizontal so that the components are gravity fed along the track and between a pair of shearing edges which require no precise registration to effect their trimming function.

8 Claims, 9 Drawing Figures

PATENTED MAR 26 1974

3,799,017

SHEET 2 OF 2

COMPONENT LEAD CUTTER

BACKGROUND OF THE INVENTION

The present invention relates to an apparatus for cutting the leads of electrical circuit components to a preselected length.

Capacitors, resistors and other packaged electrical circuit components are usually provided in stock form with long wire feeds which must be trimmed to length prior to their installation on printed boards. Representative of the many types of lead cutting devices which have heretofore been provided are those disclosed in the U.S. Pat. Nos. to Zimmerman 2,777,477; Schultz et al 2,872,979; Strauss 2,934,098; Berg 3,375,857; Hall 3,396,758; Schwartz 3,403,540; and Susonz 3,540,494. However, such devices typically include complex mechanisms which make the machines unduly expensive and difficult to operate and maintain.

SUMMARY OF THE PRESENT INVENTION

It is therefore a primary object of the present invention to provide a novel component lead cutter which is fast acting, simple in structure and economical in cost.

Briefly, the present invention includes a suitable chassis having a slotted track mounted to its top. The track is inclined at an angle to a horizontal so as to provide a gravity fed passageway for the components whose leads are to be trimmed. The leads project through the slotted track so that a shearing mechanism disposed beneath the track shears them to length as they pass by. Means are also provided for adjusting the relationship between the track and the shearing mechanism to permit selection of the lead cut length. The chassis is provided with a chute and container on the front side for receiving the lead scrap and has a container for receiving the prepared components on the rear side.

The several advantages of the present invention will no doubt become apparent to those of ordinary skill in the art after having read the following detailed description of the preferred embodiments which are illustrated in the several figures of the drawing.

IN THE DRAWING

DETAILED DESCRIPTION OF THE PREFERRED EMBODIMENTS

Figure 1:
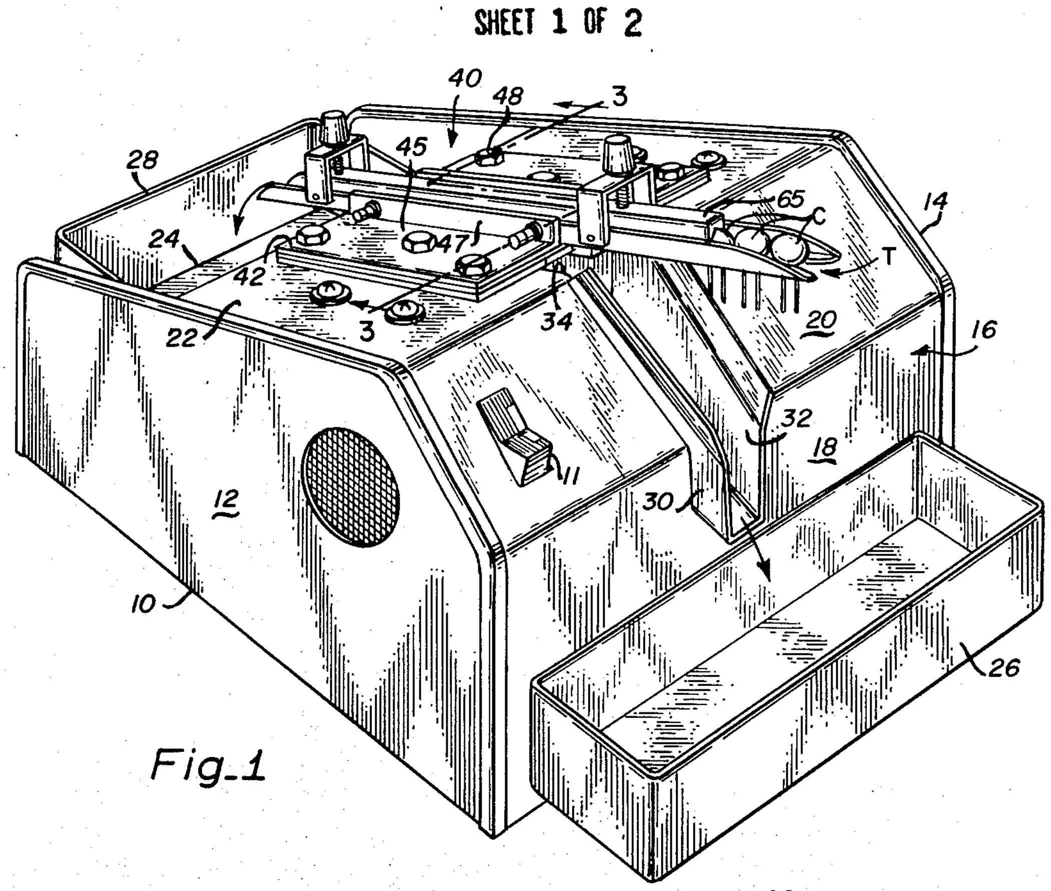
FIG. 1 is a perspective view of a component lead cutter in accordance with the present invention.

Referring now to FIG. 1 of the drawing which is a schematic diagram of a presently preferred embodiment of a component lead cutting apparatus in accordance with the present invention, it will be noted that the apparatus device includes a chassis 10 comprised of a pair of sidewalls 12 and 14 joined together by a preformed sheetmetal member bent in three places to provide a vertical front wall 18, a sloped front wall 20, a rearwardly sloped top 22, and a rear wall 24. Affixed to the front wall 18 is a scrap receptacle 26 for collecting the cut-away scrap segments of component lead wire. A similar receptacle 28 is affixed to rear wall 24 for receiving the trimmed circuit components.

A slot 30 is cut through walls 20 and 18 to receive a scrap chute 32 which extends internally of chassis 10 to collect lead scraps and convey them into receptacle 26. An opening 34 is also provided in top 22 as will be further described below.

Figures 2, 3:
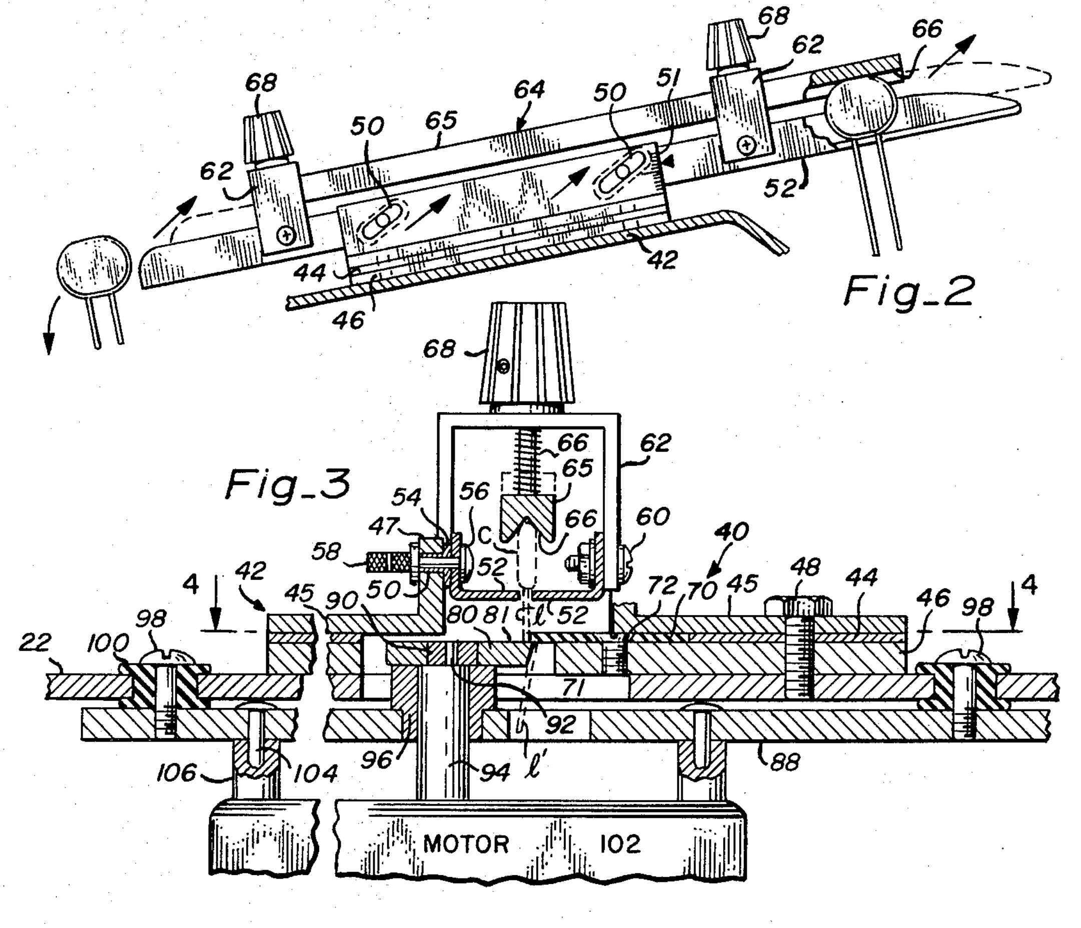
FIG. 2 is a side view illustrating the component track and adjustment mechanism shown in FIG. 1.
FIG. 3 is a cross section taken transversely through the upper portion of the cutter shown in FIG. 1 to illustrate the operation of the component track and shearing mechanism.

Affixed to the upper surface of top 22 is a component track mechanism 40 shown more clearly in FIGS. 2 and 3. Mechanism 40 includes a pair of mounting brackets 42 and their accompanying spacers 44 and 46. The flat portions 45 of brackets 42 are secured to top 22 by six bolts 48 while the upturned edges 47 lie in spaced apart relationship above opening 34. As shown in FIG. 2 of the drawing, bracket edges 42 are provided with a pair of parallel slots 50 which are inclined upwardly and to the front of mechanism 40. Positioned adjacent each of the upturned edges 47 is a rail 52 having an L-shaped cross section with its upturned portion spaced from the upturned portion of bracket 42 by a spacer 54 (FIG. 3).

The bottom sides of rails 52 are spaced from each other to provide a slotted passageway through which the component leads may pass as the components slide down the trackway formed by rails 52. Extending through the upturned sides of rails 52, spacers 54 and slots 50 are bolts 56. Knurled nuts 58 are threaded onto the ends of bolts 56 for locking each rail 52 in position relative to the corresponding bracket 42. Affixed to rails 52 proximate their ends by suitable bolt means 60 are a pair of inverted U-shaped brackets 62 for supporting a guide member 64.

Guide member 64 is comprised of an elongated bar 65 having a concave or an inverted V-shaped groove 66 extending longitudinally along its entire length to receive the tops of component bodies C as they slide along track T. Bar 65 is suspended from brackets 62 by screw threaded height adjusters 66 having adjustment knobs 68 affixed to their opposite ends.

From the above description it will be appreciated that two modes of adjustment are provided in the mechanism 40. The first adjustment involves lead cut length adjustment and is effected by loosening the knurled nuts 58 to permit the position of track T to be adjusted relative to chassis top 22 to provide for component lead cut selectivity as will be further explained below. The second adjustment has to do with changing the separation between bar 65 and track T to accomodate components having larger or small body sizes.

Figure 4:
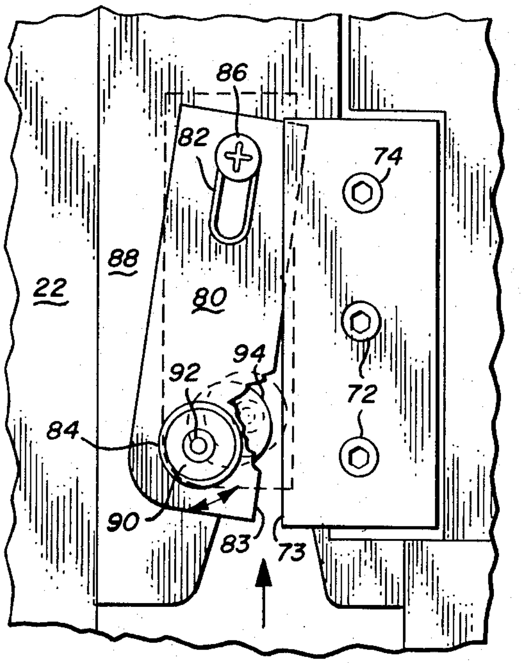
FIG. 4 is a top view taken along the line 4—4 of FIG. 3 to illustrate the operative components of a shearing mechanism in accordance with the present invention.
Figure 5:
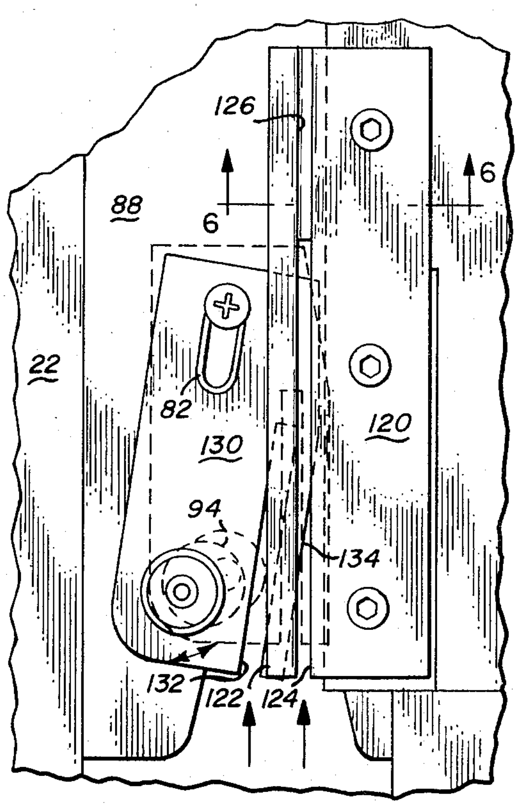
FIG. 5 is a top view taken along the same line as FIG. 4 to illustrate an alternative embodiment of a shearing mechanism for trimming electrical components having two sets of downwardly extending leads.
Figure 6:
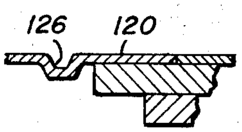
FIG. 6 is a section taken along the line 6—6 of FIG. 5 to illustrate one embodiment of an alternative shearing plate.

Referring now specifically to FIG. 3 and additionally to FIG. 4, which is a section taken through FIG. 3 along the line 4—4, it will be noted that a fixed rectangularly configured shear plate 70 is sandwiched between one of the brackets 42 and its spacer 46. The plate 70 is secured to spacer 46 by a pair of flat headed screws 72 which pass through holes provided therein. Note that a third hole 74 is also provided in plate 70 to enable the plate to be flipped over and repositioned to present a new shearing edge. This effectively provides four edges per plate.

Positioned adjacent plate 70 and slightly therebeneath so that its upper face 81 is substantially co-planar with the lower face 71 of plate 70 is a movable shear plate which I will hereinafter refer to as cutter 80. Cutter 80 is provided with a slotted aperture 82 at one end (FIG. 4) and a circular aperture 84 at the other end. Aperture 82 is for receiving a screw 86 which fastens cutter 80 to a mounting plate 80 that is suspended beneath chassis 10 and disposed parallel to top 22. Circular aperture 84 is provided with a bearing member 90 whose central aperture receives an eccentric stub 92 which projects from the end of motor drive shaft 94.

Suitable bushings 96 are provided as indicated for raising cutter 80 to a suitable height above plate 88 and to provide a surface for sliding engagement with the lower surface of cutter 80. Plate 88 is suspended from chassis top 22 by four bolts 98 which pass through resilient grommets 100. Grommets 100 provide a degree of vibration isolation between plate 88 and chassis 10 while at the same time allowing vibratory motion to be imparted to plate 88 due to the normal vibrations created in motor 102. The motor 102, having a shaft 94 for driving cutter 80, is suspended beneath plate 88 by suitable bolts 104 which pass through the elongated standoffs 106.

As shaft 94 rotates, stub 92 will also rotate in bearing 90. However, since stub 92 is not coaxial with its carrying shaft 94, it will impart an eccentric motion to cutter 80 causing it to be simultaneously displaced longitudinally relative to screw 86 and pivoted thereabout. As this occurs, it will be noted that edge 83 of cutter 80 is caused to cross under edge 73 of plate 70 thereby producing a cutting, or more properly, a shearing action between the two plates. Thus, it will be appreciated that as the component leads "*l*" pass into the space between the two plates, a shearing action will take place separating the scrap portion *l'* from the component lead *l*.

Motor 102 is preferably a slow shaft speed device, or a variable speed device having a shaft velocity variable from about 20 RPM's to about 175 RPM's. It will be appreciated that the difference in required shaft speed will be a function of the feed rate of components to be prepared. For example, where the components are hand loaded a speed range at the low end of the spectrum is quite suitable. However, where the components are machine fed shaft speeds in the upper end of the spectrum are recommended. For general purpose application I have found that a shaft speed of approximately 60 RPM's is quite suitable.

To trim the leads on a particular type of component, the guide bar 65 is adjusted by turning knobs 68 until the vertical spacing between bar 65 and track T is just large enough to allow the components to slide easily therebetween. Next, the knurled-nuts 58 are loosened and the track assembly 40 is raised to a height sufficient to position the components above the shearing devices such that the leads are sheared at some desired length. To facilitate this adjustment, reference may be made to the vernier scale and arrow shown at 51. The apparatus is then started by depressing switch 11 into the ON position causing motor 102 to be energized. As motor 102 rotates shaft 94, the eccentric stub 92 causes cutter 80 to oscillate in a pivoting, translatory motion about screw 86 thereby causing a shearing action to take place between edge 83 of cutter 80 and edge 73 of shearing plate 70.

The components whose leads are to be trimmed are then inserted into the track slot formed between rails 52 and the vibratory action of the motor driving shearing cutter 80 combines with the sloped configuration of track T to cause the components to slide down the track slot with their leads eventually passing into the space between shearing edges 73 and 83. As cutter 80 oscillates toward plate 70, the leads disposed therebetween are sheared and the scrap leadwire drops downwardly into the chute 32 and thence into the container 26. The trimmed component continues to proceed down the track slot until it reaches the end thereof, at which time it drops off into the container 28.

Note that since cutter 80 moves at an eccentric oscillatory fashion, it tends to aid in urging the components down the track slot after the leads have been sheared. Note also that no component-cutter assembly registration is required since even if less than all of the leads of a given component are cut during one oscillation of blade 80, the component will subsequently be allowed to migrate further down the slot with the result being that the remaining lead or leads will be cut during the following oscillation.

Turning now to FIGS. 5–8, an alternative embodiment of the track and cutting mechanism adapted for cutting leads of components having two sets of parallel arrayed spaced apart leads such as those referred to in the art as DIP's, is shown. As illustrated in the top view of FIG. 5, the stationary shearing plate 120 includes two shearing edges 122 and 124. The shearing edge 122 is formed by the outside edge of the plate while the edge 124 is formed by providing a longitudinal slot along the length of the plate. Note that in order to enable the ends of the leads sheared by the interior cutting edge to pass over the portion of plate 120 adjoining the two cutting edges, that portion of plate 120 aligned with the slot is deformed downwardly to provide a trough-like passageway 126 (see FIG. 6) for the cut leads.

Figure 8:
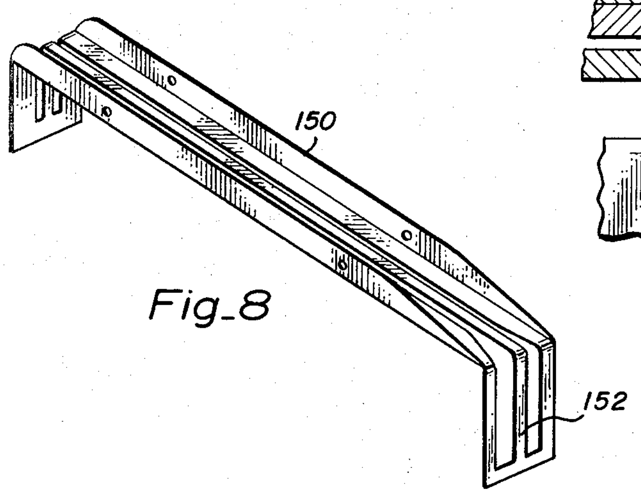
FIG. 8 is a perspective view of an alternative component track for use in an alternative embodiment of the type suggested in FIGS. 5—7.

The cutting blade 130 for this embodiment is wider than the previously disclosed cutter 80 and has a longitudinal slot provided therein to form a second cutting edge 132. The outer edge of cutter 130 forms the second shearing edge 134. In order to accomodate the dual sets of leads, the track member must also be modified to provide two sets of slots. One way in which this can be accomplished is illustrated in FIG. 8 by the modified track member 150. In this embodiment, the ends of the track member 150 are bent downwardly and extend far enough to provide clearance for the longest standard component lead length to be encountered. The end portions of the track member 150 serve to support the center rail 152 at each end.

Figure 9:
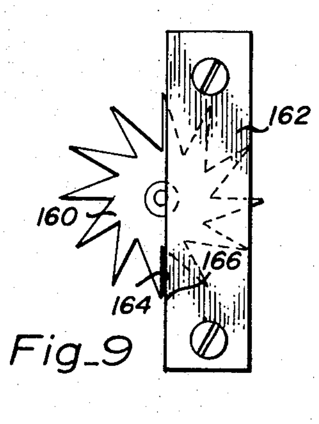
FIG. 9 is a top view illustrating another alternative shearing mechanism for use in accordance with the present invention.
Figure 7:
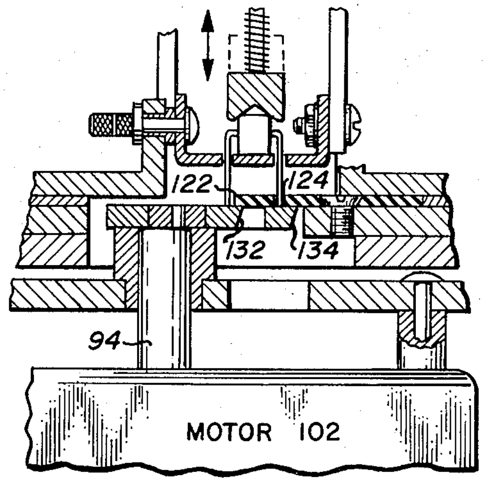
FIG. 7 is a cross section taken along the same line as FIG. 3 in an alternative embodiment using the shearing mechanism shown in FIG. 5.

In FIG. 9 an alternative shearing mechanism is illustrated which includes a toothed shearing cutter 160 disposed beneath a fixed shearing plate 162. Cutter 160 is driven by the shaft of a motor such as the previously described motor 102. As the wire leads are transported down the track, as previously described, and along a path represented by the arrow, they are shearingly engaged by the shearing edges 164 of cutter 160 and 166 of plate 162, and are thereby severed as in the previous embodiments.

Because of the simplicity of the previously disclosed mechanisms, the device can be easily changed from a single row lead cutting configuration to a dual or even perhaps triple lead cutting configuration by simply replacing the track and shearing elements. Moreover, it is contemplated that after having read the foregoing disclosure, many alterations and modifications of the present invention will no doubt become apparent to those skilled in the art. It is therefore to be understood that this description is for purposes of illustration only and is in no way intended to be limiting. Accordingly, it is intended that the appended claims be interpreted as covering all modifications which fall within the true spirit and scope of the invention.

What is claimed is:

1. An electrical component lead cutting apparatus, comprising:

a chassis;

a pair of elongated rails supported by said chassis and disposed in side-by-side spaced relationship to provide a lead receiving slot therebetween, said rails forming a track for transporting the bodies of electrical components having leads to be trimmed, the leads projecting through said slot as said component moves along said track;

shearing means supported by said chassis and disposed beneath said rails for shearing said leads as said components move along said track, said shearing means including a motor, means forming a fixed shearing edge, and means driven by said motor forming a moving shearing edge which cooperates with said fixed shearing edge to sever the component leads as the components move along said track, said motor including an eccentric drive means which is operative to cause said moving shearing edge to move in oscillatory fashion relative to said fixed shearing edge; and adjustment means for enabling the spacing between said track and said shearing means to be varied so that the lead cut length can be selected.

2. An electrical component lead cutting apparatus as recited in claim 1 wherein one end of said track is disposed higher than the other end thereof so that the components are caused by their own weight to move along said track.

3. An electrical component lead cutting apparatus as recited in claim 1 wherein said track includes a third rail disposed in side-by-side spaced relationship with one of said pair of rails to form another lead receiving slot.

4. An electrical component lead cutting apparatus as recited in claim 3 wherein said shearing means includes a motor, means forming a pair of fixed shearing edges, and means forming a pair of moving shearing edges which cooperate with said fixed shearing edges to sever component leads extending through said slots.

5. An electrical component lead cutting apparatus as recited in claim 4 wherein said motor includes an eccentric drive means for driving said moving shearing edges in an oscillatory fashion relative to said fixed shearing edges.

6. An electrical component lead cutting apparatus as recited in claim 1 and further including an elongated guide member disposed above said track and operative to engage said component bodies to restrain them from moving vertically with respect to said track as they move therealong.

7. An electrical component lead cutting apparatus as recited in claim 1 wherein said adjustment means includes bracket means affixed to said chassis, said bracket means having parallel slots provided therein which are angularly disposed relative to said track, and means affixed to said rails and extending through said slots whereby all selected positions of said track lie parallel to each other.

8. An electrical component lead cutting apparatus as recited in claim 1 which further includes a first receptacle disposed proximate the component loading end of said track for receiving lead scraps and a second receptacle disposed proximate the component discharge end of said track for receiving the lead trimmed components.

* * * * *